UNITED STATES PATENT OFFICE.

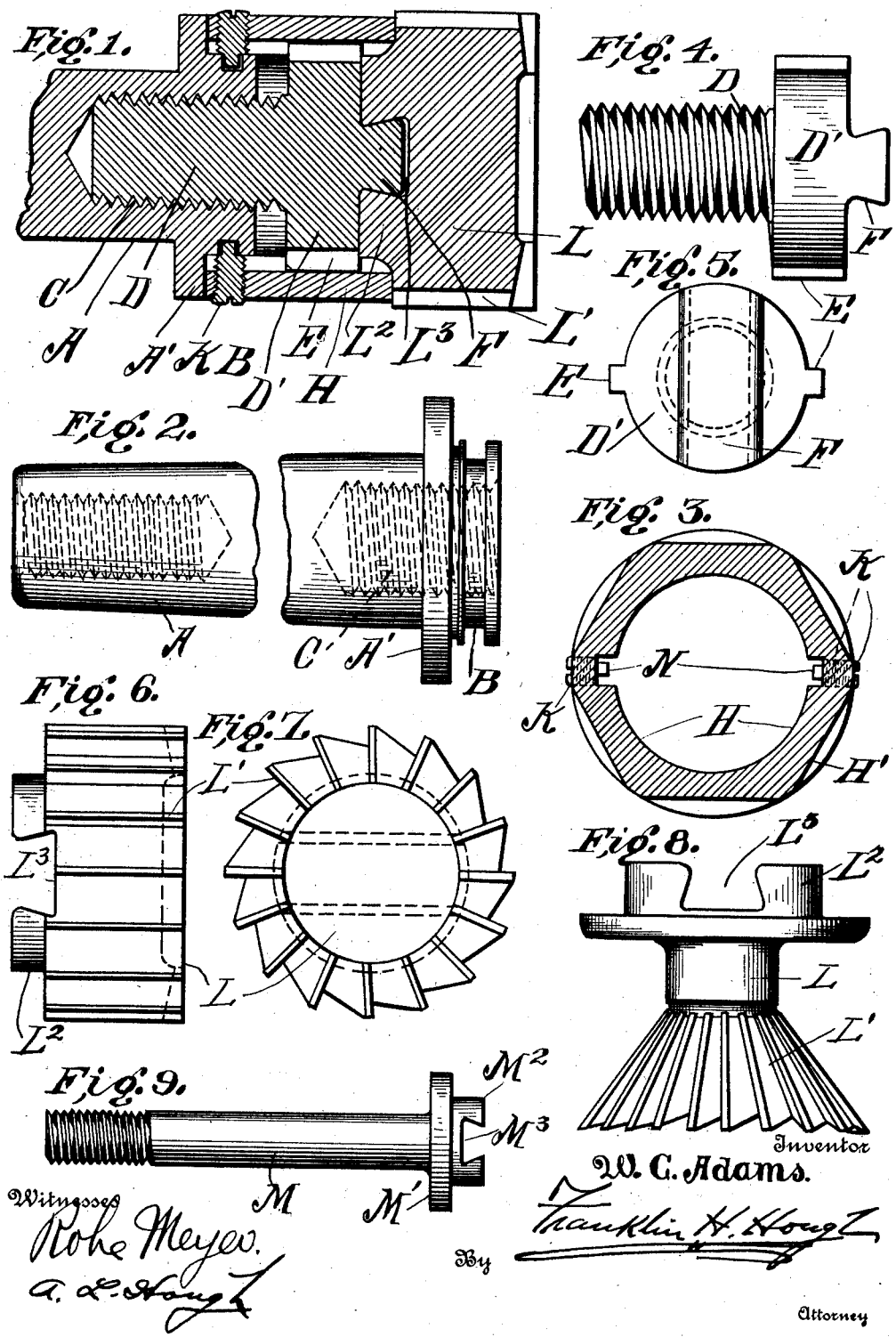

WILLIAM CHARLES ADAMS, OF HARTFORD, CONNECTICUT.

ARBOR AND CUTTER.

1,044,333.   Specification of Letters Patent.   Patented Nov. 12, 1912.

Application filed May 3, 1912.   Serial No. 694,942.

*To all whom it may concern:*

Be it known that I, WILLIAM C. ADAMS, a citizen of the United States, residing at Hartford, in the county of Hartford and State of Connecticut, have invented certain new and useful Improvements in Arbors and Cutters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cutter arbors and cutters and the object in view is to generally improve upon and render more efficient the usual form of cutters by the provision of a cutter which may be easily removed by simply turning the sleeve and sliding the cutter laterally.

Heretofore in shell cutters, it has been the practice to form a hole for an arbor and which must be of a sufficient size to insure stiffness of the arbor and also some means of driving it, usually a key way in the hole or slot across the top. Both of these are serious objections as it is a well known fact that a solid cutter of a high speed steel will harden and retain its temper much better than one with a hole formed therein. The key way in the hole tends to weaken the cutter so that there is always danger of the cutter breaking in the hardening or when in use, while additional work is necessary for forming the hole and key way as well as grinding the hole to fit the arbor.

With these ends in view, I aim in my improved arbor and cutter to overcome the objections enumerated as my cutter is without shank or hole, rendering it possible to construct the same with plain, straightforward work and at a minimum cost and with little waste of material.

The invention consists further in the provision of a simple and efficient cutter and arbor which will reduce to a minimum the cost of manufacture, forming a more compact and solid cutter, capable of standing greater strain than the cutters as usually constructed and one in which the cutters will run true and require less grinding than with the usual shank cutters by reason of the cutting action being distributed among all the teeth of the cutter.

My invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a sectional view through the sleeve and cutter and a portion of the shank in which the same are removably held. Fig. 2 is a view of the shank with the sleeve, cutter and pull back removed. Fig. 3 is a detail view of the sleeve. Fig. 4 is a detail view of the pull back. Fig. 5 is an end view of the pull back. Fig. 6 is a side elevation of the cutter. Fig. 7 is an end view, and Fig. 8 is a modified form of a cutter.

Reference now being had to the details of the drawings by letter, A designates the shank of the device which is adapted to be held in the spindle of a machine in the usual manner by means of a tie rod, not shown. Said shank portion has a flange A' at one end and an annular groove B formed in a projecting portion, as shown clearly in the drawings, and the flanged end of the shank is provided with a recess C, the wall of which is interiorly threaded for the reception of the threaded end D of the pull back D', which latter is provided with diametrically opposite lugs E, and a dovetail projection F upon the face thereof.

A sleeve, designated by letter H, is provided preferably with an angular outlined circumference H' for the reception of a wrench for convenience in turning the same, and at points diametrically opposite in the inner surface of said sleeve are the recesses N extending the length of the sleeve, and leading through the bottom of each recess is a threaded aperture in which the retaining screws K are fitted. The inner ends of said screws are contracted and are adapted to engage the annular groove B, forming means for securely holding the sleeve to said shank.

The cutter, designated by letter L, is provided with a circular series of cutting teeth L' about the circumference and end thereof, said teeth having cutting ends as well as longitudinal cutting edges and upon the rear face of the cutter is a projection $L^2$, having a dove-tailed recess L³ therein and of a size and shape adapted to receive the dove-tail projection F when the parts are assembled as shown in Fig. 1 of the drawings. Said cutter head is adjusted in place by merely sliding the cutter over the projection F, thereby forming a secure connection with the pull back D⁷.

In order to adjust the cutter head to the pull back, which latter has first been screwed into the hole in the end of the shank, it will be necessary that the outer face of the pull back be either flush with or beyond the edge of the sleeve to allow the cutter head to be slipped on to the dove-tail portion of the pull back, after which the cutter and the shell may be rotated together, thus causing the pull back to screw into the shank and the cutter drawn back with the inner face of the same against the outer face of the sleeve, thus securely clamping the various parts together in a solid, compact mass.

By the provision of my improved cutter arbor and cutter, it will be noted that the cutters may be easily removed and adjusted in place and, when two spindles opposite each other are used, the ends of the spindles may be placed much closer together than with the tapering shanks on the usual cutters as very little room is required in taking cutters from the arbor. It will be noted that various styles or sizes of cutters may be adapted to the holder.

What I claim to be new is:—

1. A cutter arbor and cutter comprising a shank with a recess in one end, the wall of which is threaded, a pull back engaging said threaded recess and having a dove-tail projection on the face thereof, a sleeve fitted over said pull back, means for holding the sleeve to said shank, means for causing the sleeve and pull back to turn together, and a cutter fitted to said pull back and abutting said sleeve, as set forth.

2. A cutter arbor and cutter comprising a shank with a recess in one end, the wall of which is threaded, said shank having a circumferential groove therein, a pull back engaging said threaded recess and having a dove-tail projection on the face thereof, a sleeve fitted over said pull back and said groove, screws mounted in threaded apertures in the sleeve and engaging said groove, forming a swivel connection of the sleeve with said shank, means for causing the pull back and sleeve to rotate together, and a cutter fitted to the pull back and held thereon by abutting said sleeve, as set forth.

3. A cutter arbor and cutter comprising a shank with a recess in one end, the wall of which is threaded, said shank having a circumferential groove therein, a pull back engaging said threaded recess and having a dove-tail projection on the face thereof, a sleeve fitted over said pull back and said groove, screws mounted in threaded apertures in the sleeve and engaging said groove, forming a swivel connection of the sleeve with said shank, the interior of said sleeve having grooves, lugs projecting from the circumference of the pull back and engaging said grooves, and a cutter engaging the pull back and held thereon by abutting said sleeve, as set forth.

4. A cutter arbor and cutter comprising a shank with a recess in one end, the wall of which is threaded, said shank having a circumferential groove therein, a pull back engaging said threaded recess and having a dove-tail projection on the face thereof, a sleeve fitted over said pull back and said groove, screws mounted in threaded apertures in the sleeve and engaging said groove, forming a swivel connection of the sleeve with said shank, the interior of said sleeve having grooves, lugs projecting from the circumference of the pull back and engaging said grooves, a cutter having a transverse slot adapted for dove-tail connection with the projection upon said pull back, said cutter being held to the latter by the wall of the shell, as set forth.

In testimony whereof I hereunto affix my signature in the presence of two witnesses.

WILLIAM CHARLES ADAMS.

Witnesses:
HARRIET MAINE,
MABEL N. BACHARACH.

Copies of this patent may be obtained for five cents each, by addressing the "Commissioner of Patents, Washington, D. C."